Oct. 14, 1952 — M. A. HELMICK — 2,613,443
GLASS LEVEL RECORDING MECHANISM
Filed July 13, 1948 — 2 SHEETS—SHEET 1

Inventor
MARION A. HELMICK
By Rule and Hoge,
Attorneys

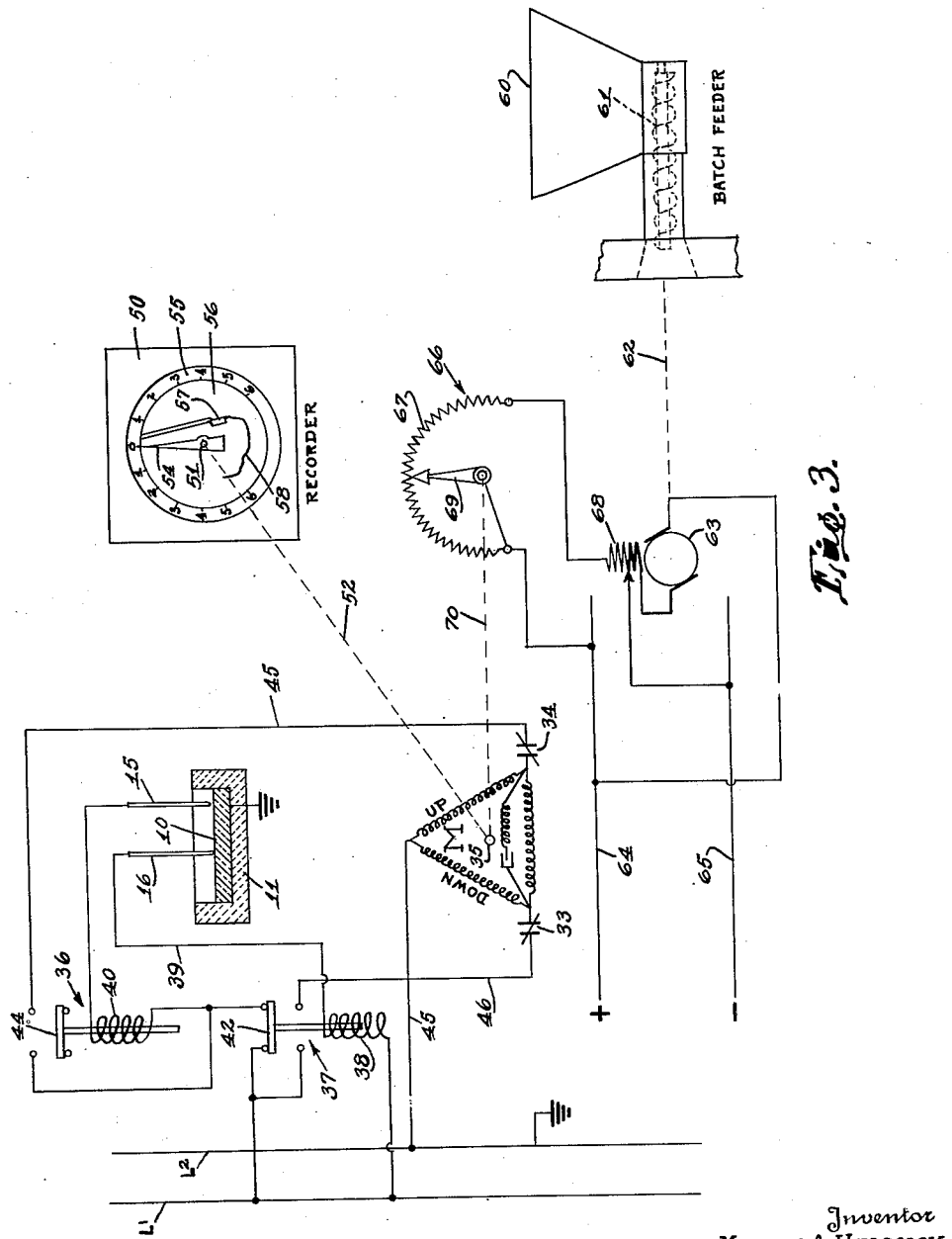

Patented Oct. 14, 1952

2,613,443

UNITED STATES PATENT OFFICE 2,613,443

GLASS LEVEL RECORDING MECHANISM

Marion A. Helmick, Fairmont, W. Va., assignor to Owens-Illinois Glass Company, a corporation of Ohio Application July 13, 1948, Serial No. 38,417

12 Claims. (Cl. 33—126)

My invention relates to apparatus for indicating the level of a liquid in a container, as for example, molten glass in a furnace tank, and for making a record of the level of the liquid in the container.

An object of the invention is to provide practical means for accurately indicating and recording the level of molten glass in a furnace tank of the continuous melting and refining type. Other objects of the invention will appear hereinafter.

Referring to the accompanying drawings:

Fig. 3 is a wiring diagram of the apparatus.

Figure 1:
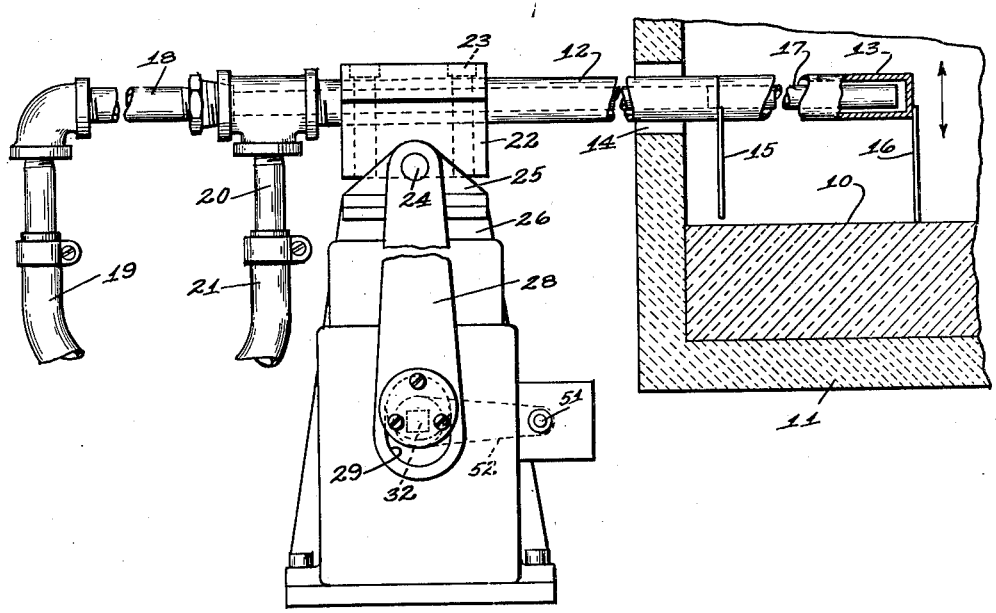
Fig. 1 is a part sectional elevational view of an apparatus embodying my invention, with parts broken away.
Figure 2:
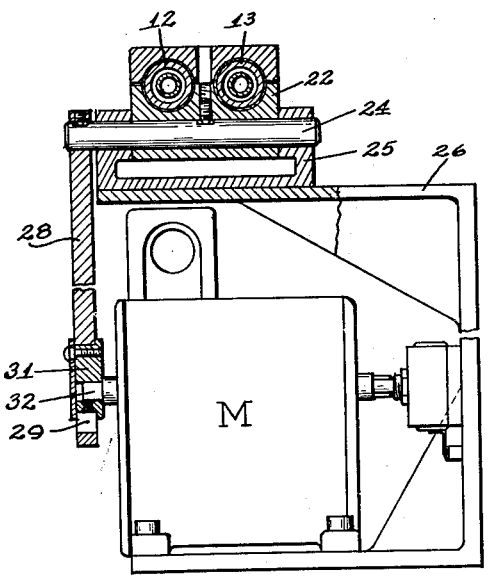
Fig. 2 is a part sectional elevation of the same, viewed in a direction at right angles to that of Fig. 1.

The apparatus as herein shown is particularly adapted for gauging and recording the level of molten glass 10 within a furnace tank 11 and is herein described as used for such purpose. It will be understood that the invention is not limited to such use, but may be adapted and used for gauging and recording the level of other liquids.

A pair of probes 12 and 13, mounted side by side, extend horizontally through an opening 14 in the wall of the tank and have connected to their forward ends respectively, feelers 15 and 16. These feelers preferably consist of depending platinum wires adapted to be moved into and out of contact with the molten glass, and serve as electrodes in the manner hereinafter described. The electrode 16 extends downward a short distance farther than the electrode 15, for example an eighth of an inch, and for convenience, the electrodes 16 and 15 are herein referred to as the long electrode and short electrode respectively.

The probes 12 and 13 are designed to permit the circulation of water or other cooling fluid therethrough and for this purpose, each probe is in the form of a tube or pipe, closed at its forward end and having an inner tube 17 extending lengthwise therethrough. The inner tube is connected through a pipe 18 with a flexible hose 19; the outer tube is connected to an inlet pipe section 20 and hose 21 through which the cooling liquid is conducted to the probe, the liquid being discharged through hose 19.

The probes are mounted in a split bearing block 22 in which they are clamped by bolts 23. The block is keyed to a rock shaft 24 extending therethrough perpendicular to the probes and journalled for rocking movement in a bracket 25 mounted on a frame 26. An electric motor M comprising a reversible rotor, is mounted in the frame 26 and serves to rock the probes about the axis of the shaft 24 for lifting and lowering the electrodes as hereinafter described.

Operating connections between the probes and the motor include a vertically disposed rock arm 28 keyed at its upper end to the shaft 24 and formed adjacent to its lower end with the vertically elongated slot 29. An eccentric 31 is keyed to the motor shaft 32 and rotates in the slot 29 as the rotor of the motor is rotated. This rotation may be limited to an arc of 180 degrees more or less, the rotation in one direction being limited and controlled by a down-limit switch 33 (Fig. 3) and in the opposite direction by an up-limit switch 34.

When the level of the glass in the tank is normal, the long electrode 16 is in contact with the glass and the short electrode 15, out of contact. The operation of the motor M is automatically controlled, as presently described, so that the motor remains at rest while the glass level is normal. If the level rises above normal so that the short electrode 15 contacts the glass, the motor is automatically started in the "up" direction, thereby swinging the probes upwardly until the electrode 15 is lifted out of contact with the glass and the motor is again stopped. If the glass level falls below normal so that both electrodes are out of contact, then the motor is started in the "down" direction so that the probes are swung downward until the long electrode 16 again contacts the glass and the motor is stopped.

The electrical control mechanism for the motor is as follows: Referring to Fig. 3, the motor M is operated by current supplied from the mains $L^1$ and $L^2$ of an alternating current system, the main $L^2$ being grounded as shown. Rotation of the motor rotor 35 is under the control of relays 36 and 37. When the glass level is normal, as shown, the relay 37 is energized. The circuit for the magnet coil 38 of relay 37 extends from the line wire $L^1$ through coil 38, wire 39, electrode 16 and the molten glass 10 which is grounded and completes the circuit to the grounded main $L^2$. The relay 36 is deenergized as the circuit for its magnet coil 40 is open at the electrode 15. When the level of the glass rises sufficiently to contact the electrode 15, a circuit is established for the relay 36, said circuit extending from the main $L^1$ through contact bar 42 of the relay 37, coil 40, electrode 15 and molten glass 10. The relay 36 therefore operates to lift the contact bar 44 and establish a circuit for the motor, said circuit extending from the main L¹ through the relay contact bars 42 and 44, wire 45, up-limit switch 34, motor M and wire 45 to main L². The motor is thus energized and operates the rotor in the "up" direction, namely in the direction to rock the probes upwardly and thereby lift the electrodes. When the short electrode 15 is thus moved out of contact with the glass, the circuit through the electromagnet coil 40 is broken so that contact bar 44 falls, thereby breaking the motor circuit and stopping the motor at a position corresponding to the glass level.

When the glass level falls so that the long electrode 16 is out of contact therewith, the circuit through the magnel coil 38 is broken, causing the contact bar 42 to drop and thereby complete a circuit from the main L¹ through contact bar 42, wire 46 and the motor which then operates in the "down" direction and lowers the electrodes until the long electrode 16 is again in contact with the glass.

As it only requires a small variation in the level of the glass in either direction to effect an operation of the motor as above described, and as a very small movement of the motor serves to readjust the position of the electrodes relative to the glass level, the position of the motor rotor substantially corresponds at all times to the level of the glass. This level is indicated and recorded by means of a recorder 50 (Fig. 3). As this recorder is a commercial item and its construction well known, it is only shown herein diagrammatically. The rotor 51 of the recorder has an operating connection 52 with the rotor 35 of the motor M. This connection may consist of an endless chain or belt, as shown in Fig. 1, driven from the motor shaft 32. The recorder includes a pointer 54 which moves over a scale 55 to indicate the level of the glass. The recorder includes a circular recording disc 56 rotated by clockwork and a stylus 57, the position of which is determined by the rotative position of the motor rotor. The stylus marks a record 58 on the disc, showing the level of the glass throughout a predetermined period, as for example, 12 or 24 hours.

In order to maintain the glass at a substantially constant level, there is provided means for automatically controlling the rate at which the batch material is fed to the melting compartment of the furnace, as presently described. The batch feeder, which may be of conventional construction, is shown diagrammatically as comprising a hopper 60 to receive the batch material and a spiral 61 by which the material is advanced into the furnace. The feeder has an operating connection 62 with the batch feeder motor 63. This motor as herein shown is a compound wound direct current motor receiving power from the mains 64 and 65. A rheostat 66 comprises a resistance 67 in series with the field winding 68 of the motor. The rheostat includes a slide 69 in the form of a rock arm having an operating connection 70 with the motor shaft 35.

When the level of the glass falls below normal, the motor M rotates the contact arm 69 in a direction to introduce additional resistance into the field circuit of the motor 63, thereby speeding up the motor and the batch feeder until the glass level is raised to normal, at which time the motor M has operated to cut out a portion of the resistance 67 and thus slows down the batch feeder. If the glass level rises above normal, the motor M operates to further reduce the amount of resistance 67 in the field circuit of the motor 63, thereby slowing down the motor and the rate at which the batch is fed.

Modifications may be resorted to within the spirit and scope of my invention.

I claim:

1. Apparatus for gauging the level of a liquid in a container, said apparatus comprising a pair of electrodes mounted over the liquid, with one electrode extending downward to a lower level than the other electrode, means for lifting and lowering said electrodes, electro-responsive means controlled by said electrodes to cause the operation of said lifting and lowering means in response to changes in level of the liquid thereby maintaining the relative position of the liquid and said electrodes approximately constant, said relative position being such that only one of the electrodes is in contact with the liquid, control circuits for said electro-responsive means including the electrodes and the liquid whereby a circuit is completed when each electrode contacts the liquid and each said circuit is broken when its respective electrode moves out of contact with the liquid, said electro-responsive means being thereby actuated to operate said lifting and lowering means to lift the electrodes when both are in contact with the liquid and lower the electrodes when neither electrode is in contact with the liquid.

2. The apparatus as described in claim 1, in combination with a recorder, and means providing operating connections between the recorder and the electrodes for actuating the recorder and recording the level of the liquid throughout a predetermined period of time.

3. Apparatus for gauging the level of molten glass in a tank, comprising a pair of probes mounted to extend over the glass in the tank, electrodes connected respectively to the probes and projecting downward, one electrode extending downward to a position to contact the glass when the latter is at a normal level, the other electrode extending downward a lesser distance and out of contact with the glass while the latter is at a normal level, an electric motor, means providing operating connections between the motor and electrodes for lifting and lowering said electrodes, electro-responsive means for causing the operation of said motor, control circuits for said electro-responsive means extending through the molten glass and from the glass through the electrodes respectively, whereby one circuit is completed when one electrode contacts the molten glass and the other circuit is completed when the other electrode contacts the glass, and each said circuit is broken when its electrode moves out of contact with the molten glass, said electro-responsive means being thereby actuated to cause operation of the motor and said lifting and lowering means to lift the electrodes when the level in the tank rises to a point at which both the electrodes contact the glass, arrest the upward movement of the electrodes when one is lifted out of contact with the glass, and lower the electrodes when the glass level lowers sufficiently to break contact with both electrodes, and to again arrest the electrodes when one electrode contacts the glass, whereby the electrodes are caused to move up and down in accordance with fluctuations in the level of the glass.

4. In combination with apparatus defined in claim 3, a recorder, and means providing operative connections between the electrodes and the recorder, causing the latter to record said variations in the level of the glass.

5. Apparatus for gauging the level of molten glass in a tank, said apparatus comprising a pair of probes mounted to extend over the glass in the tank, electrodes connected to the probes and extended downward over the glass, each said probe comprising an outer tube and an inner tube, means for circulating a cooling fluid through the tubes, means for lifting and lowering said electrodes, electro-responsive means for effecting the operation of said lifting and lowering means, control circuits for said electro-responsive means including the electrodes respectively and both circuits including the molten glass whereby a circuit is completed when each electrode contacts the molten glass and each said circuit is broken when its respective electrode moves out of contact with the molten glass, said electro-responsive means being thereby actuated to operate said lifting and lowering means and cause the lifting and lowering means to move the probes up when both electrodes are in contact with the liquid and down when neither electrode is in contact with the liquid, and maintain the lifting and lowering means at rest while only one electrode is in contact with the liquid.

6. The combination with a glass furnace tank and molten glass therein, of a pair of probes mounted adjacent to said tank and projecting over the glass in the tank, electrodes connected respectively to said probes and projecting downward toward the glass, a rock shaft, means connecting the probes to the rock shaft for rocking movement therewith, a reversible electric motor, means providing operating connections between the motor and the rock shaft for rocking the latter, thereby lifting and lowering the electrodes, electro-responsive means controlled by said electrodes for controlling the operation of said motor, said electro-responsive means being operable when both electrodes are in contact with the glass to cause operation of the motor in a direction to lift said electrodes, operable when both electrodes are out of contact with the glass to cause operation of the motor in the reverse direction and thereby lower the electrodes, and operable to maintain the motor at rest while only one electrode is in contact with the glass.

7. The combination defined in claim 6, including a level recorder, and means providing operating connections between the recorder and the said motor for operating the recorder and thereby recording the level of the glass as determined by the position of the electrodes.

8. The combination with a furnace tank and molten glass therein, of a reversible electric motor, means providing a source of current supply for the motor, a pair of electrodes mounted for up and down movement over the glass in the tank, means providing operating connections between the motor and the electrodes for moving the latter up and down, relays in the motor circuits, one said relay having a magnet coil in circuit with one said electrode, the other relay having a magnet coil in circuit with the other electrode, said relays when both their magnet coils are energized, being operable to establish a circuit for the motor by which the motor is operated in a direction to lift both the said electrodes and operable when both electrodes are deenergized to operate the motor in the reverse and thereby lower the electrodes, the motor circuits being open when only one said relay is energized, and an indicator operatively connected to the motor and indicating the level of the glass in the tank.

9. The combination defined in claim 6 including a second electric motor, and automatic means controlled by the electrodes for varying the speed of said second motor in response to variations in the level of the glass.

10. The combination with a glass furnace tank and molten glass therein, of a pair of electrodes mounted over said tank, means for lifting and lowering said electrodes, electro-responsive means controlled by said electrodes for controlling said lifting and lowering means, control circuits for said electro-responsive means including said electrodes and the molten glass whereby a circuit is completed when each electrode contacts the molten glass and each said circuit is broken when its respective electrode moves out of contact with the molten glass, said electro-responsive means being operable when both electrodes are in contact with the glass to cause operation of the lifting and lowering means in a direction to lift the electrodes, operable when both electrodes are out of contact with the glass to cause operation of the lifting and lowering means in a direction to lower the electrodes, and operable to maintain the lifting and lowering means at rest while only one electrode is in contact with the glass.

11. The combination defined in claim 1, including a level recorder, and means providing operating connections between the recorder and the said lifting and lowering means for operating the recorder and thereby recording the level of the glass as determined by the position of the electrodes.

12. Apparatus for gauging the level of a liquid in a container, said apparatus comprising a pair of electrodes mounted over the liquid, with one electrode extending downward to a lower level than the other electrode, and electro-responsive means operable automatically to lift and lower the electrodes in response to changes in the level of the liquid, and thereby maintaining the relative height of the liquid and said electrodes approximately constant, control circuits for said electro-responsive means including the electrodes and the liquid whereby a circuit is completed when each electrode contacts the liquid and each said circuit is broken when its respective electrode moves out of contact with the liquid, said electro-responsive means being operable to lift the electrodes when both electrodes are in contact with the liquid, operable to lower the electrodes when both electrodes are out of contact with the liquid and operable to maintain the electrode at rest while only one electrode is in contact with the liquid.

MARION A. HELMICK.

REFERENCES CITED

The following references are of record in the file of this patent:

UNITED STATES PATENTS

| Number | Name | Date |
|---|---|---|
| 1,941,897 | Hiller | Jan. 2, 1934 |
| 2,032,016 | Hitner | Feb. 25, 1936 |
| 2,110,313 | Warrick | Mar. 8, 1938 |
| 2,297,680 | Alling | Oct. 6, 1942 |
| 2,331,354 | Stout | Oct. 12, 1943 |
| 2,380,436 | Holdman | July 31, 1945 |
| 2,394,220 | Wagner | Feb. 5, 1946 |